United States Patent [19]
Platt

[11] 3,941,414
[45] Mar. 2, 1976

[54] CONVERTIBLE CAMPER TRAILER
[76] Inventor: Frederick J. Platt, 9 Surrey Drive, Huntington, Conn. 06484
[22] Filed: Nov. 18, 1974
[21] Appl. No.: 524,774

[52] U.S. Cl. .................... 296/23 G; 52/66; 296/27
[51] Int. Cl.² ........................................ B60P 3/34
[58] Field of Search.... 296/23 G, 23 C, 23 H, 23 R, 296/23 F, 27, 26; 52/66

[56] References Cited
UNITED STATES PATENTS

| 496,459 | 5/1893 | Waggener et al. | 296/27 |
| 1,568,895 | 1/1926 | Lyons | 296/23 R |
| 2,837,778 | 6/1958 | Kein | 296/23 R X |
| 3,709,551 | 1/1973 | McCarthy | 296/27 X |
| 3,797,880 | 3/1974 | Pezzaglia | 296/26 |
| 3,850,470 | 11/1974 | Trelle | 296/27 X |

FOREIGN PATENTS OR APPLICATIONS

| 1,092,318 | 11/1960 | Germany | 296/23 C |

Primary Examiner—Robert G. Sheridan
Assistant Examiner—Donald W. Underwood
Attorney, Agent, or Firm—Thomas L. Tully; Arthur A. Johnson

[57] ABSTRACT

A camper trailer adapted to be converted from a retracted, trailable condition in which it has normal length and width and reduced height which does not obstruct the rear view of the driver of the towing vehicle and a power-erected, livable condition in which it has normal length and height and expanded width whereby the amount of living space within the erected camper is increased substantially over the amount of living space available in a camper trailer having the corresponding normal length, width and height. A feature of the invention involves the provision of extension assemblies which are mounted in each side of the camper trailer and are slidable to an extended position to increase the width of the camper and substantially increase the living space therewithin.

5 Claims, 12 Drawing Figures

CONVERTIBLE CAMPER TRAILER

A great variety of convertible camper trailers are known but most of these are small compact campers comprising canvas extensions which are unfolded manually to provide sleeping facilities for a few occupants. A few solid convertible camper trailers of full size are known. A full-size camper trailer is one of solid construction having a width approximately that of a standard automobile, i.e. from 6 to 7 feet, a length approximating at least twice the width, i.e. from 12 to 16 or more feet, and a height of from 6½ to 8 feet and including facilities for living, dining, bath and kitchen. The known covertible trailers of this type are difficult to erect because of the size and weight of the roof section, and can accommodate only a small number of people in comfort because of the relatively narrow width of the camper and the necessity to provide space for beds, furniture and kitchen and bath facilities.

It has been proposed to provide convertible camper trailers with extensions in the end walls thereof so that the length of the camper can be increased to accommodate sleeping facilities, for instance, at each end of the camper. This increases the living area within the camper by removing two beds into the extensions but does not create a sufficiently substantial increase in living space in cases where the camper contains four beds, because it does not affect the width of the camper, which is its most confining dimension.

It is the principal object of the present invention to provide a full-size convertible camper trailer which is easy to erect in spite of its solid construction, and which is expandable to provide comfortable living space for a family of from 6 to 8 persons.

It is another object of this invention to provide a full-size convertible camper trailer which has a width which is easily expandable from a trailable width of about 7 feet 4 inches to an extended width of about 11 feet whereby the living space within the camper is substantially increased.

It is yet another object of this invention to provide a convertible camper trailer with solid wall extensions which are self-contained pull-out, track-mounted members which can be unfolded and attached to the roof of the camper to provide self-supporting stable extensions.

These and other objects and advantages of the present invention will be apparent to those skilled in the art in the light of the present description, including the drawings in which:

The novel convertible camper trailers of the present invention are best described by reference to the drawings in which like reference characters in the various views represent like elements.

Figures 1, 2:
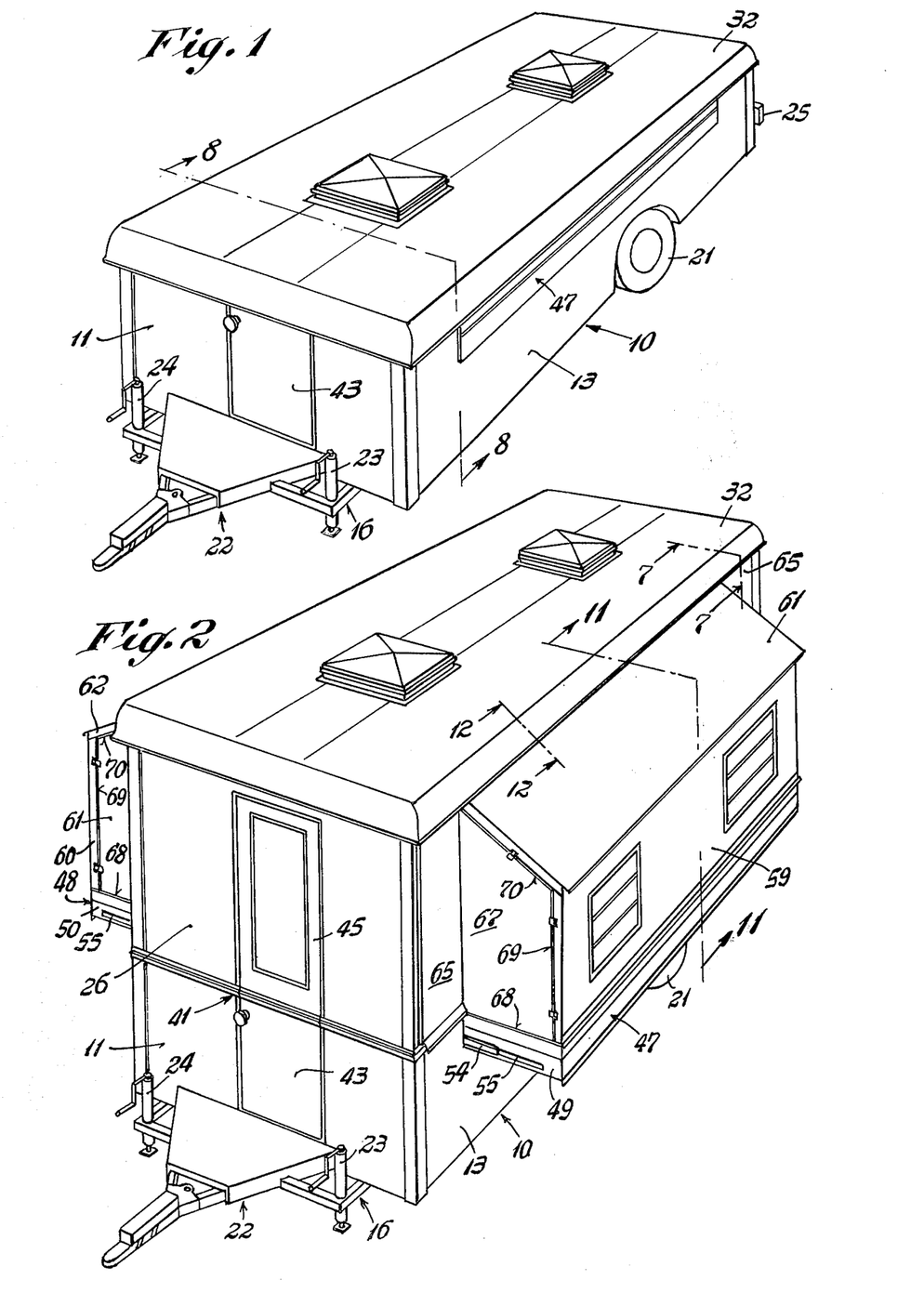
FIG. 1 is a perspective view of a camper trailer in retracted, trailable condition according to the present invention.
FIG. 2 is a perspective view of the camper trailer of FIG. 1, shows in erected livable condition.

As illustrated by the drawings, the present camper trailer comprises a rectangular box base 10 having opposed fixed end walls 11 and 12 and opposed fixed side walls 13 and 14 and a floor 15, the contacting walls being rigidly connected to each other and to the floor by means of suitable structural hardware to provide a durable rigid box base 10 as shown. The box base 10 comprises the container for the expandable elements of the camper when such elements are in the retracted position, as illustrated by FIG. 1, and also comprises the support for such elements when the latter are in erected position, as illustrated by FIG. 2.

The box base is built upon and supported by a conventional chassis frame 16 which includes a spring-mounted wheel assembly comprising axle support bar 17, springs 18 and 19 and wheels 20 and 21 (shown most clearly in FIG. 8), the wheels and tires preferably being of the same size and interchangeable with the wheels and tires of the towing vehicle. In addition, the chassis frame 16 also comprises a front hitch tongue 22 and support jacks 23 and 24, and a rear bumper 25, as shown in FIGS. 1 and 2.

As stated supra, the box base 10 is the container and the support for the expandable elements of the present camper and such expandable elements comprise upper end wall sections 26 and 27 which are hingedly connected to base end walls 11 and 12 respectively and each of which has a pair of rollers or wheels, one wheel 28, 29 and 30 and 31 rotatably mounted at each corner adjacent the upper edge of each end wall section. The roof 32 has connected to the underside thereof opposed parallel longitudinal rails 33 and 34, rail 33 engaging wheels 28 and 30 and rail 34 engaging wheels 29 and 31, whereby simultaneous movement of upper end wall sections 26 and 27 from down position in which they lie generally horizontal and perpendicular to base end walls 11 and 12 to which they are hingedly attached respectively, and erected position in which they are generally vertical and coplanar with said base end walls, causes said wheels to travel within their respective tracks to move the roof 32 from down position, as illustrated by FIG. 3 of the drawings.

Figure 3:
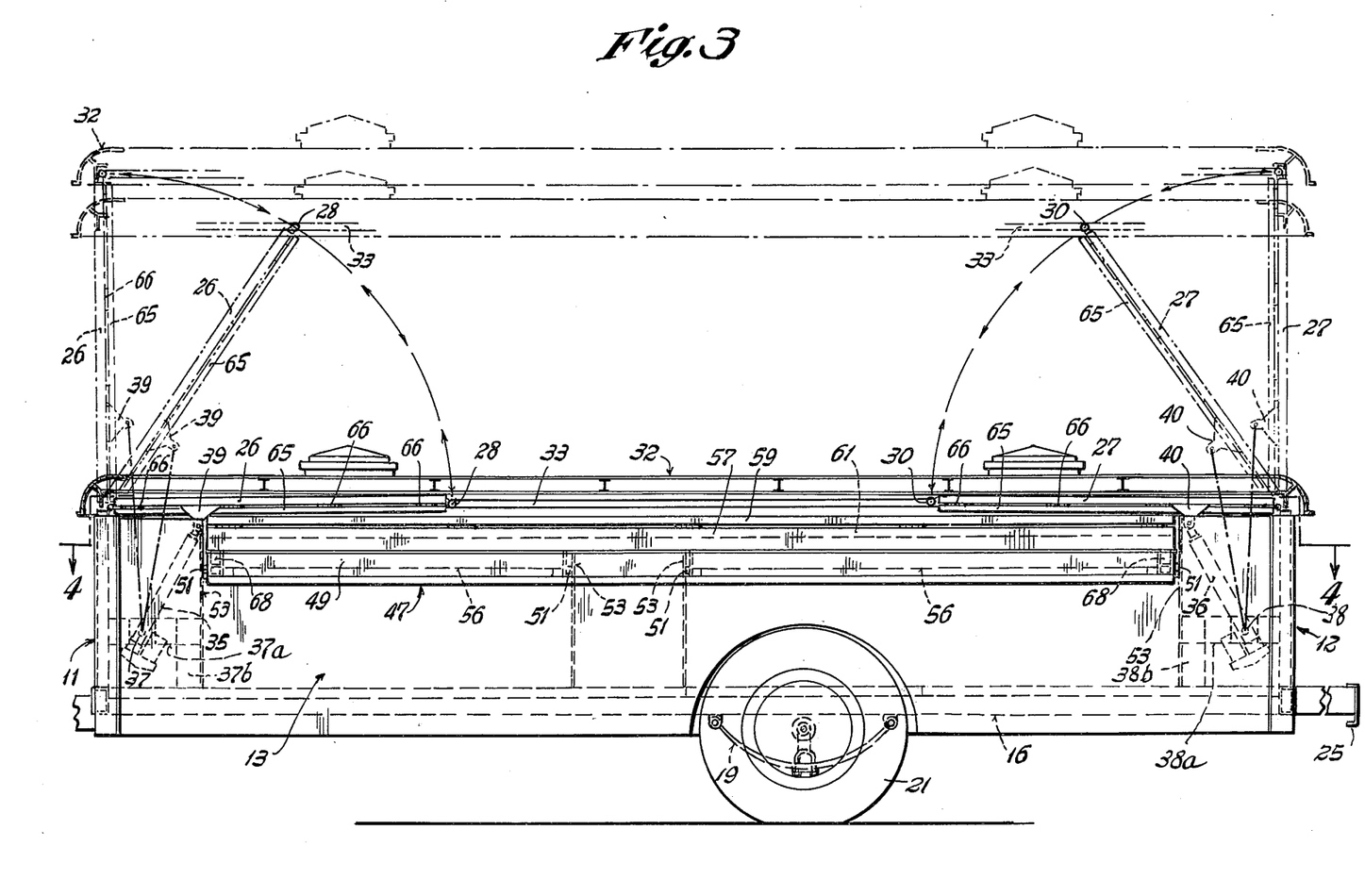
FIG. 3 is a side elevational view of the camper trailer of the present invention shown in retracted condition, interior elements and the erection of the roof element being illustrated by broken lines.
Figure 4:
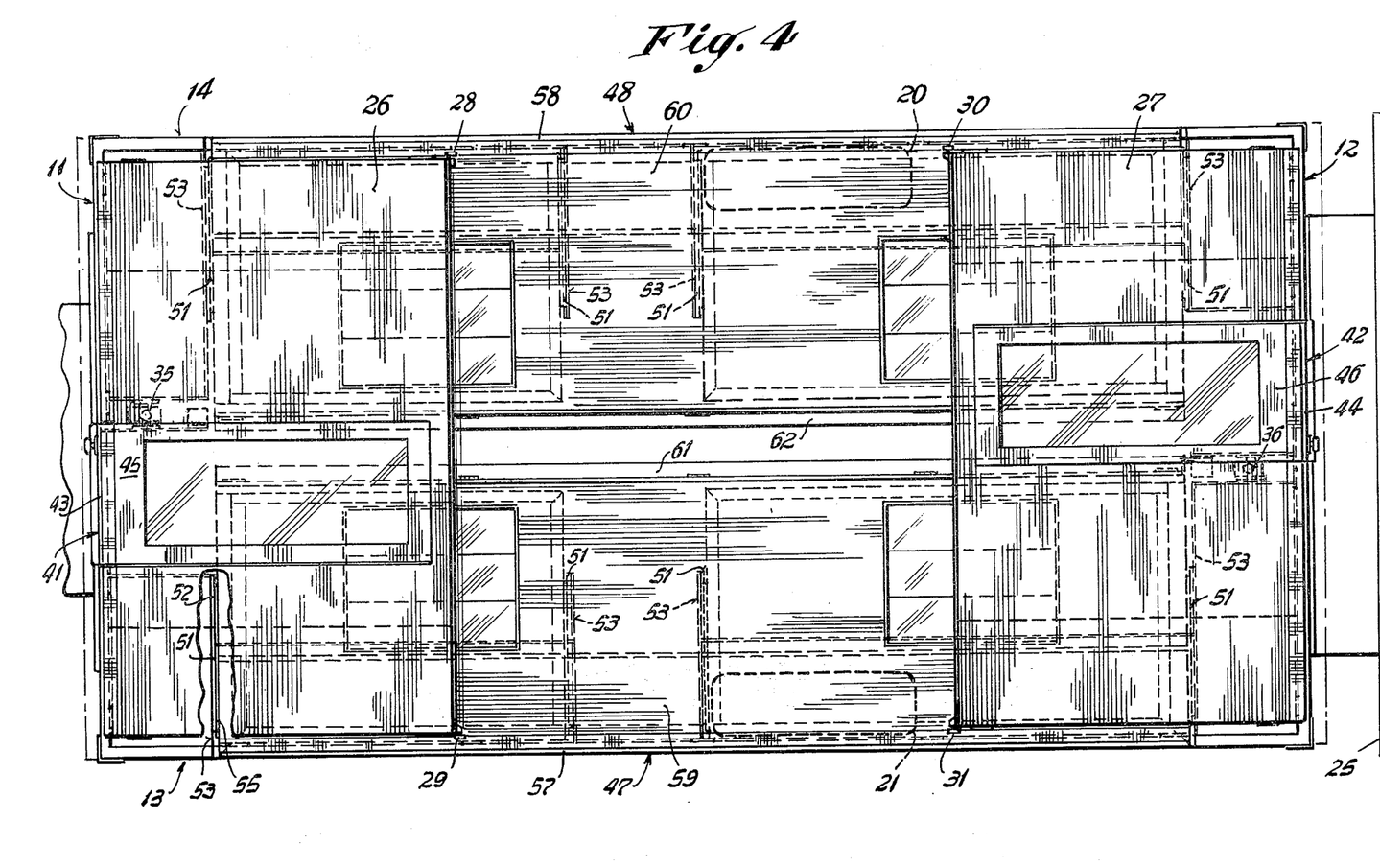
FIG. 4 is a plan view taken along the line 4—4 of FIG. 3 and illustrating the elements of the present camper trailer in retracted position as they appear beneath the roof element, not shown.
Figures 5, 6, 7:
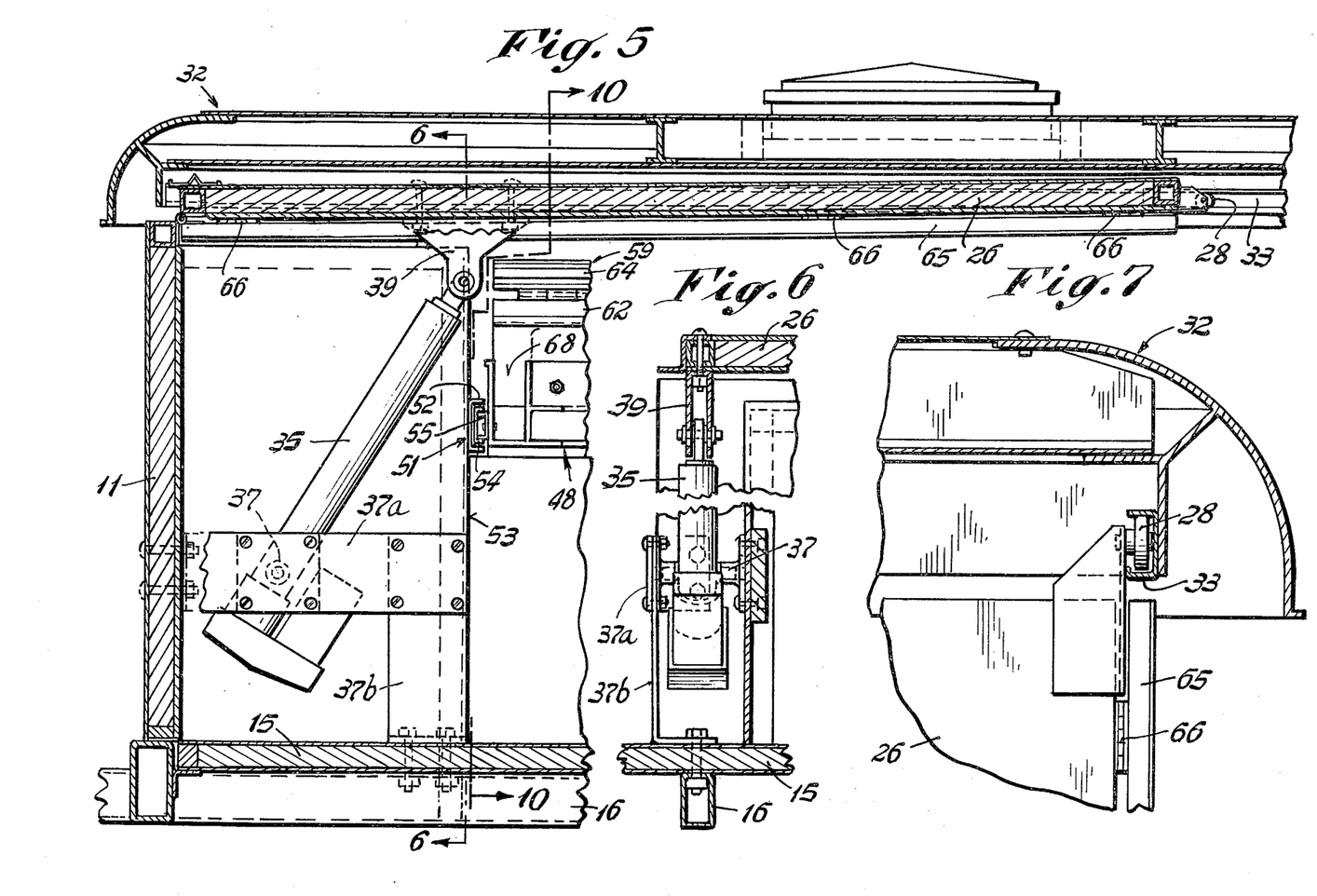
FIG. 5 is an enlarged fragmentary sectional view taken along the line 5—5 of FIG. 8.
FIG. 6 is a fragmentary sectional view taken along the line 6—6 of FIG. 5.
FIG. 7 is an enlarged fragmentary sectional view taken along the line 7—7 of FIG. 2.

FIGS. 3, 5 and 6 of the drawings also illustrate the power operation system for the raising and lowering of the upper end wall sections 26 and 27 and simultaneous raising and lowering of the roof 32. This comprises electrically-operated telescoping linear power actuators 35 and 36 which operate on 12 volts D.C. power from a battery and/or converter by means of trunnion mounts 37 and 38 respectively, each of which is supported on a cross member 37a and 38a attached to the end walls 11 and 12 respectively and to floor support members 37b and 38b which are attached to the floor 15, as shown more clearly in FIG. 5 of the drawings. The upper end of each actuator is attached to the upper end wall sections 26 and 27 respectively by means of attachment fittings 39 and 40, the attachment to wall sections 26 and 27 being adjacent the opening for doors 41 and 42, each of which comprises a base door section 43 and 44 and a top door section 45 and 46 respectively. The base door sections 43 and 44 operate independently of the top door sections 45 and 46 when the camper trailer is in the down or retracted position so that access can be had to the actuation microswitch on each linear actuator 35 and 36 to cause erection of the camper. Each linear actuator preferably is provided with a microswitch and with a slip clutch and a limit stop. When the microswitches are pushed to activate the actuators 35 and 36, the telescoping element of each actuator slowly pushes upward against upper wall sections 26 and 27 respectively causing them to pivot to the erect position as illustrated by FIG. 3 of the drawings. As this occurs, the wheels 28 and 30 travel within roof rail 33 while wheels 29 and 31 travel within roof rail 34 to cause the roof to be raised from its retracted position to its erect position, as shown, in which it may be latched to the top of upper wall sections 26 and 27. When the roof is fully raised, the clutch of the actuators slips and the microswitch is released and returns to the off position.

At this point, the roof and end walls of the camper trailer are erect and the base and top door sections of doors 41 and 42 interlock with each other so that each door operates as a unitary element. The next step involves the enclosure of the upper sides of the camper trailer, and this is accomplished in a manner which substantially enlarges the living area within the camper trailer and yet maintains the solid, durable airtight and weatherproof structure which is an advantage of the camper trailers of the present invention.

Figures 8, 9:
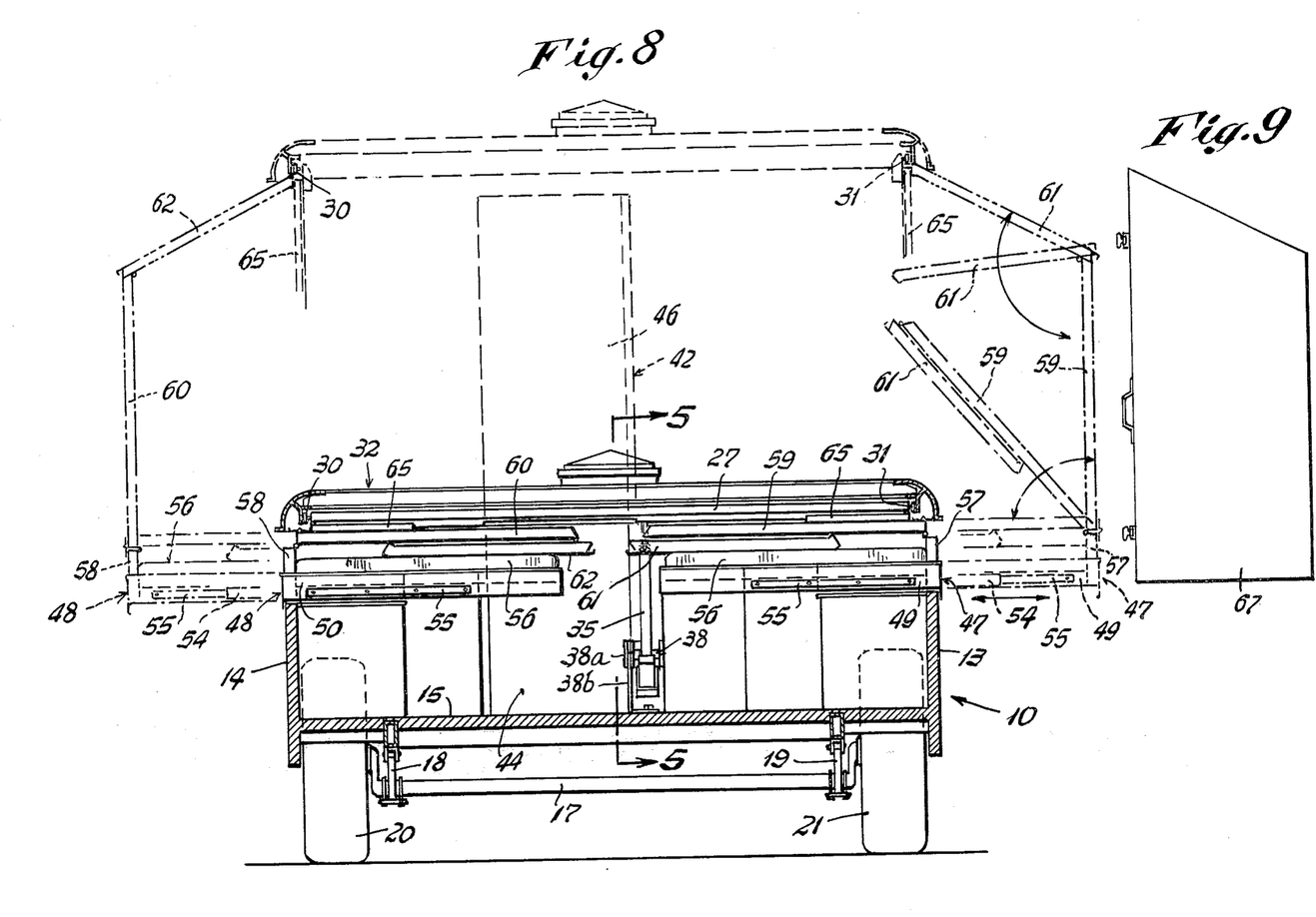
FIG. 8 is a vertical sectional view taken along the line 8—8 of FIG. 1 and illustrating the roof section in erect position in broken lines and further illustrating the side extensions in different stages of erection, also in broken lines.
FIG. 9 is a side view of an extension panel to be associated with the erected side extension of the present camper trailers as an end enclosure.

The main body of the upper side structure of the present trailers comprises folded slide assemblies 47 and 48, shown in FIGS. 1, 3, 8 and 10, for instance, which are rail-mounted within the side walls 13 and 14 of the base 10 between closed position in which they are disposed within the base 10 and flush with walls 13 and 14 respectively, as shown in FIGS. 1 and 8, and open position in which they are pulled outward on the telescoping rails from side walls 13 and 14 for unfolding and erection.

Figure 10:
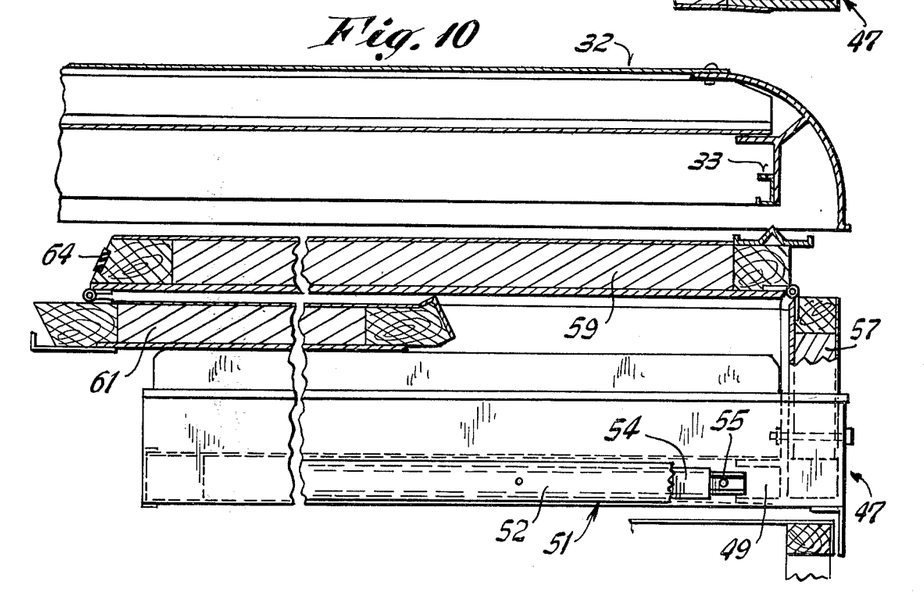
FIG. 10 is an enlarged fragmentary sectional view taken along the line 10—10 of FIG. 5.

Referring to FIGS. 3, 8 and 10 of the drawings, it is noted that slide assemblies 47 and 48 are identical in structure, support and operation so that any description pertaining to one assembly applies also to the other. Thus, slide assemblies 47 and 48, as illustrated by FIGS. 8 and 10, each comprise a pair of base panels 49 and 50 respectively, each of which is connected to the base 10 by means of four conventional sliding telescoping rail or track elements 51 which comprise a wide outer track 52, which is fixed to a wall 53 secured to the base 10 and to the wall 13, a center floating or sliding track 54 and narrow interior track 55 which is fixed to the base panels 49 and 50 respectively of the slide assemblies. As illustrated by FIGS. 2 and 8, when the slide assembly 47 is manually pulled from the side wall 13, the tracks telescope so that the center floating track 54 moves to an intermediate position, shown by broken lines in FIG. 8, in which it serves as a brace between the wide track 52 fixed to the wall 53 of base 10 and the narrow track 55 fixed to the base panel 49 of the slide assembly 47.

When the slide assemblies 47 and 48 are pulled to open position, like drawers, they are ready to be unfolded to form the side extensions. Each slide assembly 47 and 48 comprises a base panel 49 and 50 respectively which, as illustrated, serves as a support for cushions 56, such as of foam padding, to provide four convertible beds having a width of about 3 feet. The base panels 49 are connected to each other for unitary sliding movement by means of a face panel 57, while base panels 50 are connected to each other for unitary sliding movement by means of face panel 58. Face panels 57 and 58 have hingedly attached thereto windowed side extension panels 59 and 60 respectively, which in turn have hingedly attached thereto roof extension panels 61 and 62, panels 57, 59 and 61 and panels 58, 60 and 62, respectively being connected to each other so as to be foldable to a closed position in which they lie generally horizontal and parallel to each other and to their respective base panels 49 and 50 and perpendicular to the respective face panels 57 and 58 to which they are attached, as illustrated by FIGS. 8 and 10 of the drawings.

Figures 11, 12:
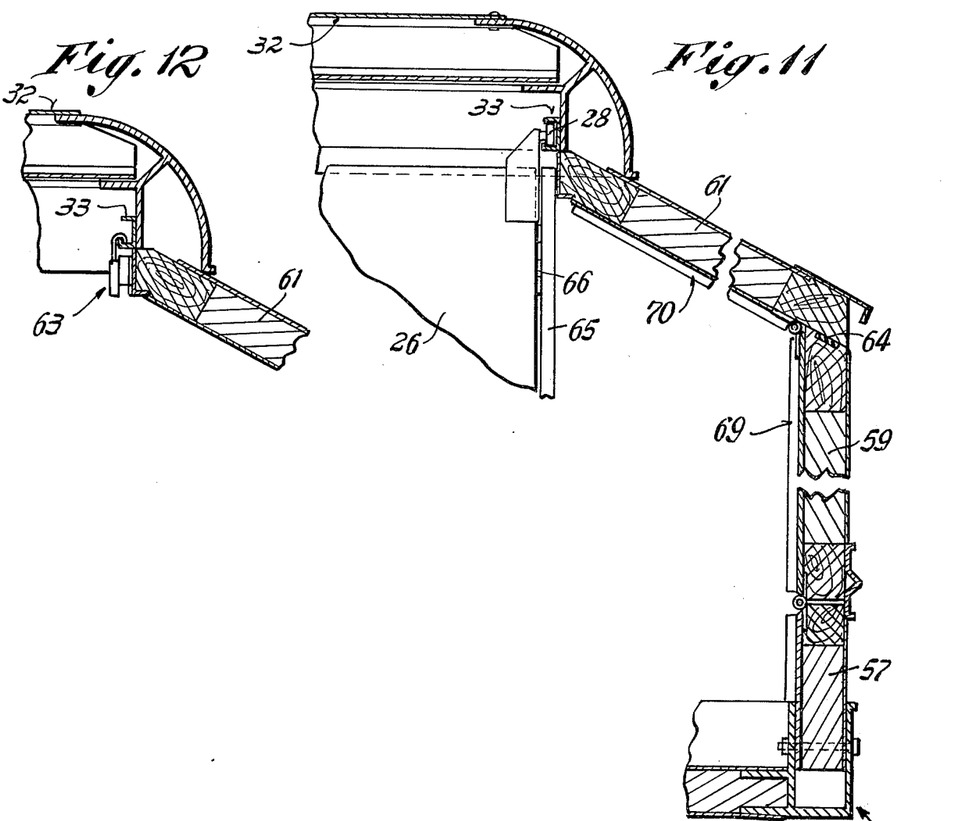
FIG. 11 is an enlarged fragmentary sectional view taken along the line 11—11 of FIG. 2.
FIG. 12 is an enlarged fragmentary sectional view taken along the line 12—12 of FIG. 2.

The roof extension panels 61 and 62 are both provided with a multiplicity of latches 63 along the upper edge of each, the latches preferably being conventional adjustable spring latches and being adapted for clamping engagement with the underside of the roof 32 such as by means of rails 33 and 34, as illustrated by FIG. 12 of the drawings. In this manner, each erected slide assembly is supported by the roof as well as by the base 10 and thus provides a sturdy extension platform, extending about 22 inches beyond the side base walls 13 and 14 to increase the overall width of the camper trailer from about 7 feet 4 inches at the base to about 11 feet at the extensions. Each extension platform supports two cushions 56, each having a width of about 3 feet and the forward cushion serving as a sofa having a length of about 4 feet while the rear cushion serves as an adult's size bed and has a length of about 5 feet 6 inches. If necessary, the backrest cushions used during the day to convert the beds to sofas may be used during the night as extensions for the beds, for instance by placing them between the forward sofas to provide a forward bed across the width of the trailer, incorporation both sofas, having a width of 4 feet and a length of about 10 feet 9 inches. During the day these cushion areas, with the backrest cushions in proper position, serve as seating areas for dining or relaxation.

The extension assemblies are rendered weathertight by means of overhanging hardware on the roof and on the assembly panels, as illustrated, continuous weatherproof hinges on the assembly panels, and a rubber insulating and cushioning strip 64 provided along the length of the upper edge of side panels 59 and 60, as shown in FIGS. 10 and 11.

The completion of the enclosure of the upper side walls of the present camper trailer, in erected position, is accomplished by means of four corner panels 65, pairs of which are foldingly attached to upper end panels 26 and 27 respectively along the side edges thereof by means of hinges 66, as shown by FIGS. 3 and 5. The corner panels 65 are folded against the inside wall of the upper end panels and latched in place when the latter are in the retracted or down position, as shown by FIG. 5, and are adapted to be unlatched and rotated 90° on the hinges to extended position in which they form corner enclosure walls when the upper end panels 26 and 27 are in the raised or erect position, coplanar with base end walls 11 and 12, as shown by FIG. 1. The corner panels 65 in extended position are latched on the interior of the camper to the upper edge of the base walls 13 and 14 and to the underside of the roof 32 to form a weathertight seal.

The final elements to be inserted to complete the assembly operation are four extension side panels 67, shown in FIG. 9, which are individual loose components which are stored within the camper trailer when the latter is in the retracted position. Panels 67 are inserted from the interior by sliding them into channel slots 68 present on the upper edge of each side of base panels 49 and 59 until they fit into front slots 69 and top slots 70 present at the corners of side extension panels 59 and 60 and at the edges of roof extension panels 61 and 62 respectively, as illustrated by FIG. 2 of the drawings, to provide a weatherproof seal. Finally the panels 67 are latched in place such as by means of conventional spring latches.

The erected camper trailer has the external appearance illustrated by FIG. 2 of the drawings, the windowed side dormer extensions being self-supporting and requiring no additional jacks or ground supports. The extensions increase the cubic footage of space within the trailer by at least about 138 cubic feet, or about 20 percent of the cubic footage of a trailer having a width and height of 7 feet and a length of 14 feet, and by up to as much as about 210 cubic feet, or about 30 percent of the cubic footage of a trailer having the aforesaid dimensions. Such a substantial increase in living space cannot be obtained in any practical manner by extending the front and rear walls of a camper trailer nor could any such end extensions be self-supporting because of the dimensions required for such a substantial increase in living space.

Preferably the camper trailer is provided with power vent fans in the ceiling area with vent elements on the roof, as illustrated, and with conventional jalousie windows on both the side extension panels 59 and 60 and on the upper door sections 45 and 46.

The interior of the present trailers can be modified greatly to suit the needs of the owner. However, four corner cabinets and two side cabinets of sturdy construction are preferably built into the trailer, attached to the floor and base walls, to provide walls 53 which support the wide outer track 52 of the sliding track assemblies 51 of the side extensions.

Variations and modifications may be made within the scope of the claims and portions of the improvements may be used without others.

I claim:

1. A convertible camper trailer comprising an oblong box base having opposed fixed parallel end walls and opposed fixed parallel side walls of substantially greater length than said end walls, a rectangular roof which is movable between a lowered position in which it engages the upper edges of the fixed walls of said box base and a raised position in which it is spaced above said fixed walls, said roof having opposed longitudinally-extending tracks on the underside thereof, opposed upper end wall sections, the lower edges of which are hingedly attached to the upper edges of each of the fixed end walls of said box base to adapt the end wall sections to pivot between folded position in which they are substantially perpendicular to said end walls when said roof is in lowered position and upright position in which they are coplanar with said end walls when said roof is in raised position, the upper portions of said end wall sections supporting opposed wheel means which engage the opposed tracks in the underside of the roof whereby movement of the upper end wall sections from folded to upright wall position causes said wheels to move in said tracks causing the roof to move from lowered to raised position, power means associated with said opposed upper end wall sections for moving said sections between folded and upright wall position while simultaneously moving said roof from lowered to raised position, and upper side wall extension panels hingedly mounted on the inside of said upper end wall sections, an extension assembly slidably mounted in each of said fixed side walls for sliding movement between closed position in which it is disposed within said box base and open position in which it extends outside said box base and beyond said fixed side wall, said extension assembly having a length less than the length of said fixed side walls and being centered within said fixed side walls so that end portions of said fixed side walls extend on each side of said extension assembly, said extension assembly comprising an extension base which is slidably mounted for movement in a direction perpendicular to said side wall, an upper side wall extension having a lower edge which is hingedly attached to said extension base and an upper edge which is hingedly attached to a roof extension panel, fastening means on the upper edge of said roof extension panel adapted to engage the roof, whereby when said extension assembly is in closed position said side wall extension and said roof extension are folded against said extension base and lie substantially parallel thereto and to each other and when said extension assembly is in open position said side wall extension is adapted to unfold to a position substantially perpendicular to said extension base and said roof extension is adapted to unfold to a position in which the fastening means thereof engage the roof, when the roof is in raised position, to connect the roof extension to the roof and support the extension assembly and said upper side extension panels are adapted to unfold from said upper end wall sections and to engage the upper edge of the fixed side walls and to engage the erect extension assembly to form upper side walls corresponding in length to the length of said end portions of said fixed side walls.

2. A trailer according to claim 1 in which said extension assembly is provided with opposed extension end panels to enclose the ends of said assembly when the assembly is in said open position.

3. A trailer according to claim 2 in which said extension end panels are in open position secured to said extension assembly in open position by means of channels in said assembly and are adapted to be slidably removed from said assembly prior to the conversion of said assembly from open to closed position.

4. A trailer according to claim 1 in which the extension base of each said extension assembly comprises a support adapted to carry two sleeping cushions in end-to-end configuration.

5. A trailer according to claim 1 in which said extension assembly is slidably mounted in said fixed side wall by means of a sliding track assembly comprising an inner and an outer track, one of which is secured to said extension assembly and the other of which is fixed to said box base, and a central floating track which moves to an intermediate position when said extension assembly is in open position and functions as a support therefor.

* * * * *